United States Patent
Akirav et al.

(10) Patent No.: US 8,891,473 B2
(45) Date of Patent: *Nov. 18, 2014

(54) DEDUPLICATED DATA PROCESSING CONGESTION CONTROL

(71) Applicant: International Business Machines Corporation, Armonk, NY (US)

(72) Inventors: Shay H. Akirav, Petach-Tikva (IL); Yariv Bachar, Ma'abarot (IL); Asaf Levy, Rishon Le Zion (IL); Ehud Meiri, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 106 days.

This patent is subject to a terminal disclaimer.

(21) Appl. No.: 13/672,884

(22) Filed: Nov. 9, 2012

(65) Prior Publication Data

US 2013/0080409 A1 Mar. 28, 2013

Related U.S. Application Data

(63) Continuation of application No. 12/773,136, filed on May 4, 2010, now Pat. No. 8,340,039.

(51) Int. Cl.
*H04W 4/00* (2009.01)
*H04L 29/08* (2006.01)
*G06F 17/30* (2006.01)
*H04L 12/803* (2013.01)

(52) U.S. Cl.
CPC .......... *H04L 47/122* (2013.01); *H04L 67/1095* (2013.01); *H04L 67/1097* (2013.01); *G06F 17/30943* (2013.01)
USPC ......................................... 370/329

(58) Field of Classification Search
CPC .................. H04W 28/02; H04W 28/12–28/14
USPC .................................................. 370/329, 230
See application file for complete search history.

(56) References Cited

U.S. PATENT DOCUMENTS

| | | | |
|---|---|---|---|
| 7,962,825 B2 | 6/2011 | Wang et al. | |
| 8,340,039 B2 * | 12/2012 | Akirav et al. | 370/329 |
| 2010/0208591 A1 | 8/2010 | Corliano et al. | |
| 2011/0216648 A1 | 9/2011 | Mehrotra et al. | |
| 2011/0219287 A1 | 9/2011 | Srinivas et al. | |

OTHER PUBLICATIONS

"PID Controller," http://en.wikipedia.org/wiki/PID_controller, available at least as early as Apr. 2, 2010, 19 pages.

* cited by examiner

*Primary Examiner* — Albert T Chou
(74) *Attorney, Agent, or Firm* — Griffiths & Seaton PLLC

(57) ABSTRACT

Various embodiments for deduplicated data processing congestion control in a computing environment are provided. In one such embodiment, a congestion target setpoint is calculated using one of a proportional constant, an integral constant, and a derivative constant, wherein the congestion target setpoint is a virtual dimension setpoint. A single congestion metric is determined from a sampling of a plurality of combined deduplicated data processing congestion statistics in a number of active deduplicated data processes. A congestion limit is calculated from a comparison of the single congestion metric to the congestion target setpoint, the congestion limit being a manipulated variable. The congestion limit is compared to the number of active deduplicated data processes. If the number of active deduplicated data processes are less than the congestion limit, a new deduplicated data process of the number of active deduplicated data processes is spawned.

18 Claims, 5 Drawing Sheets

```
1    CongestionControlFeedbackLoop ()   {
2      loop forever {
3        if (timeToSample)   {
4          congestionMetric   = SampleCongestion();
5          processLimit       = CongestionPIDController(congestionMetric);
6        }
7        if (nActiveProcesses < processLimit AND pendingProcessesInQueue)   {
8          SpawnNewProcess();
9        } else if (nActiveProcesses > processLimit)   {
10         AbortAnExistingProcess();
11       }
12       sleep();
13     }
14   }
15
16   CongestionPIDController(congestionMetric)   {
17     error           = setpoint - congestionMetric;
18     errorIntegral   = errorIntegral + error;
19     errorDerivative = (error - lastError) / timeDeltaFromLastSample;
20
21     newProcessLimit = error * Kproportional +
22                       errorIntegral * Kintegral +
23                       errorDerivative * Kderivative;
24
25     return newProcessLimit;
26   }
```

FIG. 5

DEDUPLICATED DATA PROCESSING CONGESTION CONTROL

CROSS REFERENCE TO RELATED APPLICATIONS

This application is a Continuation of U.S. patent application Ser. No. 12/773,136 filed on May 4, 2010.

FIELD OF THE INVENTION

The present invention relates in general to computers, and more particularly to apparatus, method and computer program product embodiments for deduplicated data processing congestion control in a computing storage environment.

DESCRIPTION OF THE RELATED ART

Data deduplication refers to the reduction and/or elimination of redundant data. In a data deduplication process, duplicate copies of data are reduced or eliminated, leaving a minimal amount of redundant copies, or a single copy of the data, respectively. Using deduplication processes provides a variety of benefits, such as reduction of required storage capacity and increased network bandwidth. Due to these and other benefits, deduplication has emerged in recent years as a highly important technological field in computing storage systems. Challenges to providing deduplication functionality include aspects such as efficiently finding duplicated data patterns in typically large storage repositories and storing the data patterns in a deduplicated storage-efficient form.

SUMMARY OF THE INVENTION

Deduplication systems may externalize various logical data storage entities, such as files, data objects, backup images, data snapshots or virtual tape cartridges. Moreover, there are further applications to deduplicated data transfer, and in general, data processing, which are local to a deduplicated storage system. It is often required that such data storage entities be electronically transferred (e.g., replicated) from their origin site to remote sites. Replicated data entities enhance fault tolerance abilities, disaster recovery, and availability of data. Such fault tolerance and high availability is increasingly demanded. Deduplicated data entities might become obsolete or fragmented over time. This means that the deduplicated storage systems might need to manipulate the deduplicated data entities, such as deleting or compacting (defragment) the deduplicated data entities to rearrange the physical storage space on which the deduplicated data entities reside.

To enhance accessibility to data, disaster recovery, and fault tolerance capabilities, it may be required that the various types of processing of deduplicated data entities residing in deduplicated storage systems be able to control congestion on the underlying system resources (e.g., storage, network, CPU) so as not to lead to severe, negative, and unexpected impacts on other mission critical procedures (e.g., backup, restore and recovery) as well as the actual deduplication data processing procedure. Congestion may occur on a deduplication data process resulting in a failure or a timeout. In the field of data deduplication, an objective is to store single instances of deduplicated data while efficiently identifying deduplicated data patterns in repositories, and store the identified deduplicated data patterns in an efficient deduplicated storage form. Pursuant to this objective, a need exists for controlling excessive congestion in the deduplicated data processes to prevent a failure or timeout in the deduplicated data processes without compromising the efficiency of identifying and storing deduplicated data. By controlling the excessive congestion occurring in deduplicated data processes, system resource utilization may be maximized, and deduplicated data processes may continue to operate at peak congestion levels without experiencing timeouts or failures. While some congestion control approaches are currently available, these conventional approaches are accompanied by drawbacks such as failing to maximize system resource utilization and the inability to continuously adjust the degree of deduplication data processing activity without prior knowledge of resource access patterns, as will be further described.

In view of the foregoing, a need exists for a mechanism providing deduplicated data processing congestion control in a manner maximizing system resource utilization by continuously adjusting the degree of deduplication data processing activity without prior knowledge of resource access patterns, among other factors. Accordingly, various embodiments for deduplicated data processing congestion control are provided. In one such embodiment, by way of example only, a method for deduplicated data processing congestion control using at least one processor device in a computing environment is provided. A congestion target setpoint is calculated using one of a proportional constant, an integral constant, and a derivative constant, wherein the congestion target setpoint is a virtual dimension setpoint. A single congestion metric is determined from a sampling of a plurality of combined deduplicated data processing congestion statistics in a number of active deduplicated data processes. A congestion limit is calculated from a comparison of the single congestion metric to the congestion target setpoint, the congestion limit being a manipulated variable. The congestion limit is compared to the number of active deduplicated data processes. If the number of active deduplicated data processes are less than the congestion limit, a new deduplicated data process of the number of active deduplicated data processes is spawned.

In addition to the foregoing exemplary method embodiment, other exemplary system and computer product embodiments are provided and supply related advantages.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which:

FIG. 5 illustrates pseudo code for an exemplary method for deduplicated data processing congestion control.

DETAILED DESCRIPTION OF THE DRAWINGS

Figure 1:
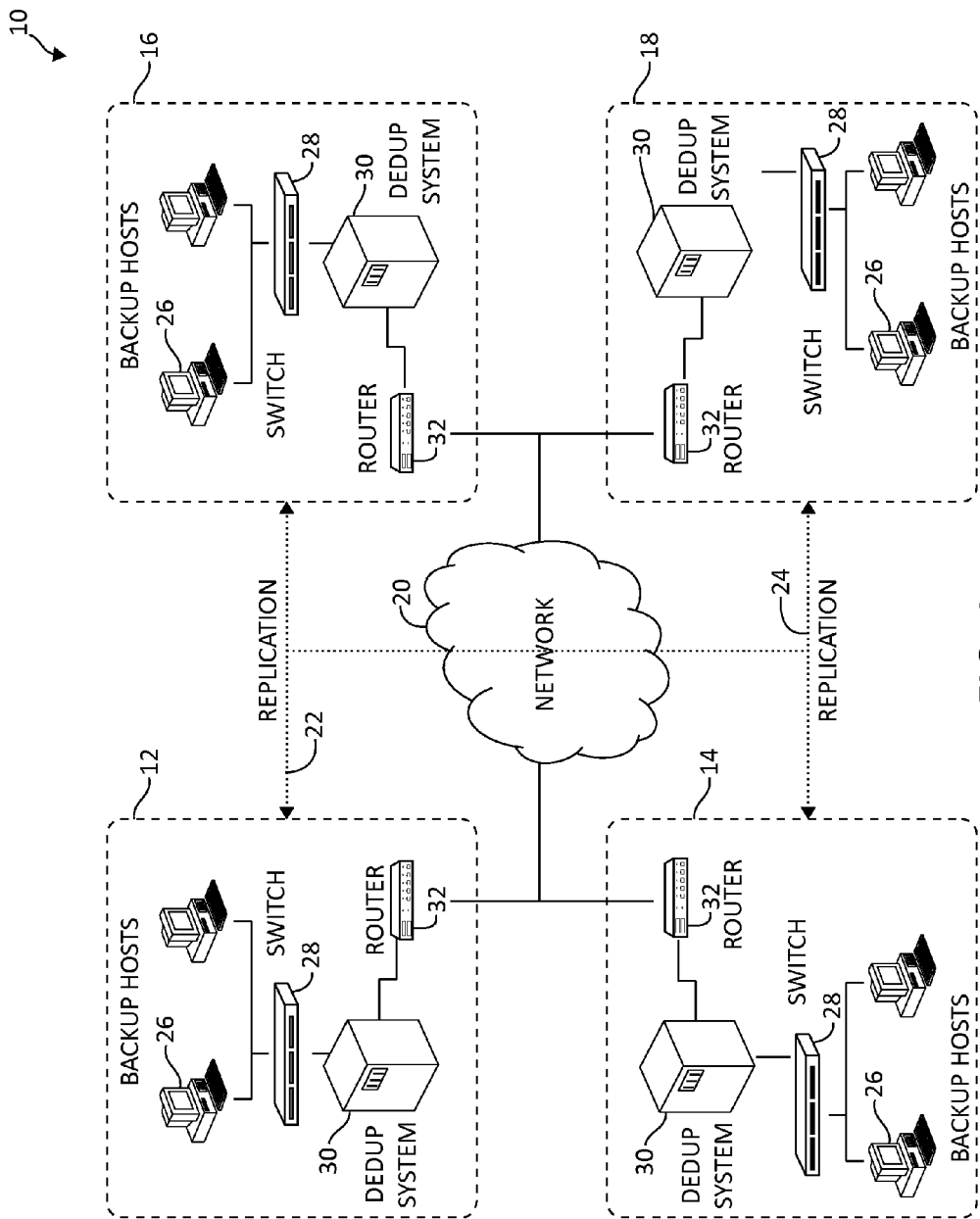
FIG. 1 illustrates an exemplary computing environment in which aspects of the present invention may be implemented.

Turning now to FIG. 1, exemplary architecture 10 of deduplication systems and related components in a computing storage environment is depicted. Architecture 10 provides storage services to several backup hosts 26. Deduplicated data replication is provided between various deduplication system groups 12, 14, 16, and 18 as indicated by dashed lines 22 and 24. Each of groups 12, 14, 16, and 18 include one or more hosts 26, which are connected to a deduplication system 30 via networking components such as a switch 28 as indicated. Deduplication systems 30 are interconnected via networking components such as a router 32, which provides internetwork connectivity between groups 12, 14, 16, and 18. A network 20 connects such deduplication systems 30 and routers 32. Network 20 may, in one embodiment, include a wide area network (WAN). In other embodiments, network 20 may include local area networks (LANs), storage area networks (SANs), and other network topologies known to the one of ordinary skill in the art. While routers 32 and switches 28 are shown, the one of ordinary skill in the art will also appreciate that additional and/or substitute networking components are contemplated.

In one embodiment, switch 28 is compliant with a fiber channel network protocol, making the switch 28 and interconnected components capable of executing commands such as small computer systems interface (SCSI) commands. Such commands may be executed for a variety of storage devices, again as the one of ordinary skill in the art will appreciate, such as disk drives, tape devices, solid state devices (SSDs), and the like. While the architecture 10 provides one example of components that may be utilized to implement various facets of the present invention and claimed subject matter, one of ordinary skill in the art will appreciate that other such architectures are contemplated.

An efficient deduplicated data processing congestion control mechanism satisfies the following considerations. First, the mechanism should simultaneously enable congestion control over multiple dimension setpoints. Second, the mechanism should enable congestion control over virtual dimension setpoints, and not necessarily physical measurements. This means that some of the setpoints that the congestion control should consider are not physically measured, but software figures of merit computed during system operation. Third, the mechanism should support parallel and/or distributed processing environments. Fourth, the mechanism should periodically monitor deduplicated data processes and adjust the degree of activity for maximized utilization of system resources. Fifth, the mechanism should prevent excessive congestion for all participating processes for all resource types used by the process (e.g. storage, CPU, network). Sixth, the mechanism should control congestion without any prior knowledge of the processes' resource usage patterns assuming the patterns are dynamic and congestion behavior is influenced by external processes. Seventh, the mechanism operates in a distributed fashion, i.e., without central control or arbitration. Eighth, the mechanism should be independent of storage systems layout, hardware specifications, and latency and bandwidth considerations.

Throughout the following description and claimed subject matter, deduplicated data processing congestion control may refer to controlling the deduplicated data processing congestion, congestion being the normalized latency or delay, of key sequences in the deduplication data processes. The normalized latencies of deduplicated data processes may occur from common tasks such as input or output functions, read or write commands to a deduplicated storage system, or the time duration required for each deduplicated data process type. The congestion sequences and their normalization latency factors may be defined by the implementer of the deduplicated data process and may constitute the performance bottlenecks or indicators of congestion. The normalized latencies for each deduplicated data process type may be thought of as congestion errors representing scalable congestion values within a set of congestion ranges. In other words, the congestion errors are measurable congestion statistics signifying the amount of congestion in each of the deduplication data processes. As will be further described, each deduplication data processes congestion measurement statistic may be combined into a single congestion metric.

In one embodiment, the single congestion setpoint may be calculated with a congestion algorithm using one of at least three mathematically generated constants, $K_p$, $K_i$, $K_d$, a proportional, an integral, and a derivative in a congestion control module, as will be further illustrated. In one embodiment, the proportional constant represents a congestion error of the present deduplicated data processing activity, the integral constant indicates historical congestion errors of deduplicated data processing activity, and the derivative constant forecasts the deduplicated data congestion error pattern trends. In one embodiment, the three constants, as well as a virtual congestion target setpoint, may be found. The virtual congestion target setpoint may be dependent on the key sequences of the algorithm, upon which the latency is to be measured, as well as trial and error, such as in configuring the setpoint to 80% of the maximal allowable latency. The constants $k_p$. $K_i$, $K_d$ may be tuned by the deduplication process implementer and remain constant values. For example, in one embodiment, each deduplicated data process may sample the normalized latencies of congestion. The samples containing each of the contributed congestion statistics of the deduplicated data processes may be combined into the congestion algorithm. The constants $K_p$, $K_i$, $K_d$ may be multiplied by the congestion error proportional, the congestion error integral, and congestion error derivative, to generate a proportional term, an integral term, and a derivative term. From the sum contribution of the proportional term's, the integral term's, and the derivative term's product, a single congestion limit value may be calculated.

In one embodiment, the single congestion limit, being a manipulated variable, represents the acceptable number of active deduplicated data processes or the degree of deduplicated data processing activity. For example, the single congestion limit allows for the mechanisms of the illustrated embodiments to operate independently of the underlying hardware configuration, and in effect, maximizes the utilization of the systems resources while operating at peak congestion limits without a timeout or failure of the deduplicated data processes.

The mechanisms of the illustrated embodiments regulate the congestion limit by comparison to a virtual congestion target setpoint. The congestion target setpoint is the desired target setpoint for the deduplicated data processes or, in other words, the desired value for deduplicated data processes and is capable of being set or configured offline. By comparing the congestion metric to the congestion target setpoint, the mechanisms of the illustrated embodiments determine the difference between the congestion target setpoint and the current congestion metric to calculate the single congestion limit. Such adjustments to the congestion limit permit continuous control of the congestion limit governing the active number of deduplicated data processes preventing a failure or timeout. One of ordinary skill in the art will appreciate that the configuration of deduplicated data processing congestion control may vary according to a particular implementation.

The illustrated embodiments provide a novel approach for deduplicated data processing congestion control, satisfying all of the considerations for efficient deduplicated congestion control described previously. In one such embodiment, the mechanisms for deduplicated data processing congestion control are optimized to enable deduplicated data processing congestion control over multiple and/or virtual dimension setpoints within a parallel application environment. Additionally, the illustrated embodiments function to maximize system resource utilization while preventing excessive congestion by continuously adjusting the degree of deduplicated data processing activity without prior knowledge of system resource access patterns, and are independent of the deduplicated storage systems' layout, hardware or network specification.

Figure 2:
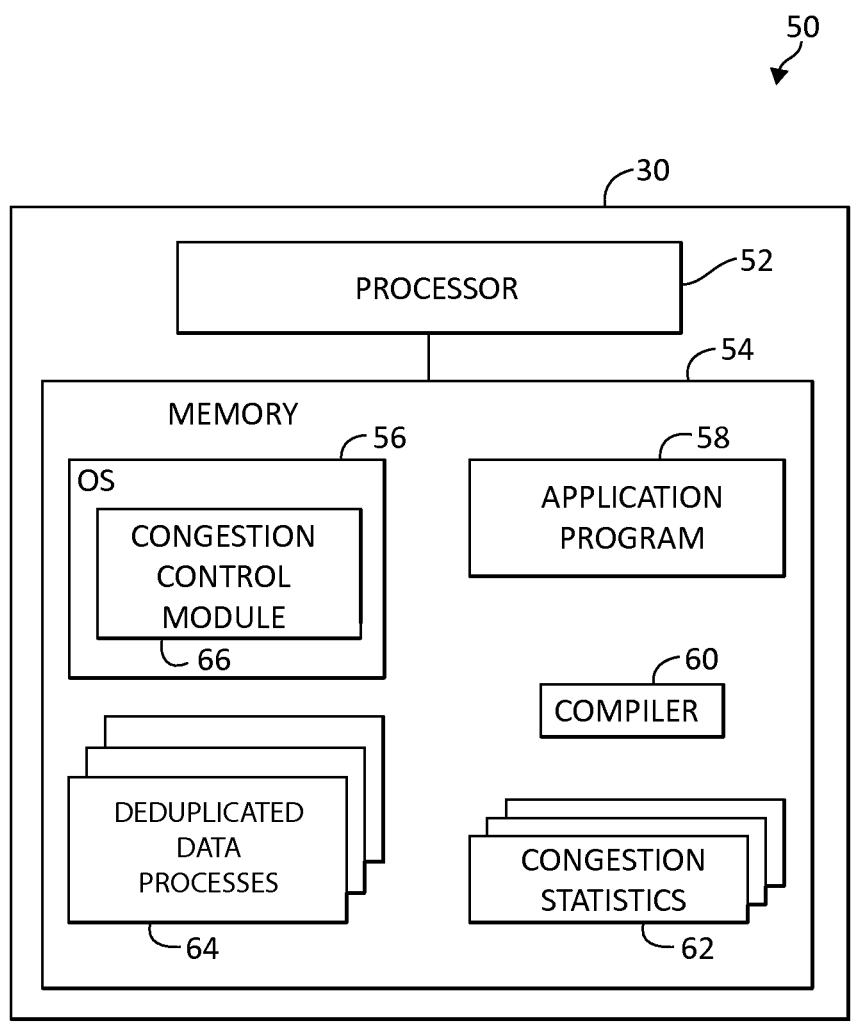
FIG. 2 illustrates an exemplary portion of a deduplication system as illustrated in FIG. 1, previously, including a processor device.

Turning now to FIG. 2, an exemplary portion 50 of a deduplication system 30 as also seen in FIG. 1, previously, is illustrated. Portion 50 of deduplication system 30 is operable in a computer environment as a portion thereof, in which mechanisms of the following illustrated embodiments may be implemented. It should be appreciated, however, that FIG. 2 is only exemplary and is not intended to state or imply any limitation as to the particular architectures in which the exemplary aspects of the various embodiments may be implemented. Many modifications to the architecture depicted in FIG. 2 may be made without departing from the scope and spirit of the following description and claimed subject matter.

Deduplication system 30 includes a processor 52 and a memory 54, such as random access memory (RAM). The deduplication system 30 may be operatively coupled to several components not illustrated for purposes of convenience, including a display, which presents images such as windows to the user on a graphical user interface, a keyboard, mouse, printer, and the like. Of course, those of ordinary skill in the art will recognize that any combination of the above components, or any number of different components, peripherals, and other devices, may be used with the deduplication system 30.

In the illustrated embodiment, the deduplication system 30 operates under control of an operating system (OS) 56 (e.g. z/OS, OS/2, LINUX, UNIX, WINDOWS, MAC OS) stored in the memory 54, and interfaces with the user to accept inputs and commands and to present results. In one embodiment of the present invention, the OS 56 facilitates congestion control module according to the present invention. To this end, OS 56 includes a congestion control module 66 which may be adapted for carrying out various processes and mechanisms in the exemplary methods described following.

The deduplication system 30 may implement a compiler 60 that allows an application program 58 written in a programming language such as COBOL, PL/1, C, C++, JAVA, ADA, BASIC, VISUAL BASIC or any other programming language to be translated into code that is readable by the processor 52. After completion, the computer program 58 accesses and manipulates data stored in the memory 56 of the system 30 using the relationships and logic that was generated using the compiler 60.

To further implement and execute mechanisms and processes according to the present invention, OS 56, in conjunction with memory 54, processor 52, program 58, and other computer processing, networking, and storage components, may implement congestion control module 66 as previously described, for, at least in part, controlling the number of deduplicated data processes 64 of deduplicated data. As the one of ordinary skill in the art will appreciate, the mechanisms of congestion control module 66, deduplicated data processes 64, and congestion statistics 62 as presently illustrated may be implemented in various forms and architectures. Accordingly, the illustration of congestion control module 66, deduplication data processes 64, and congestion statistics 62 in the present figure is again intended to demonstrate logical relationships between possible computing components in the deduplication system 30, and not to imply a specific physical structure or relationship.

In one embodiment, instructions implementing the operating system 56, the computer program 58, and the compiler 60, as well as the congestion control module 66, deduplication data processes 64, and congestion statistics 62 are tangibly embodied in a computer-readable medium, which may include one or more fixed or removable data storage devices, such as a zip drive, disk, hard drive, DVD/CD-ROM, digital tape, SSDs, etc. Further, the operating system 56 and the computer program 58 comprise instructions which, when read and executed by the system 30, cause the system 30 to perform the steps necessary to implement and/or use the present invention. Computer program 58 and/or operating system 56 instructions may also be tangibly embodied in the memory 56 and/or transmitted through or accessed by network 20 via various components (e.g., router 32, FIG. 1). As such, the terms "article of manufacture," "program storage device" and "computer program product" as may be used herein are intended to encompass a computer program accessible and/or operable from any computer readable device or media.

Embodiments of the present invention may include one or more associated software application programs 58 that include, for example, functions for managing a distributed computer system comprising a network of computing devices, such as a storage area network (SAN). Accordingly, processor 52 may comprise one or more storage management processors (SMP). The program 58 may operate within a single computer and/or deduplication system 30 or as part of a distributed computer system comprising a network of computing devices. The network may encompass one or more computers connected via a local area network and/or Internet connection (which may be public or secure, e.g. through a virtual private network (VPN) connection), or via a fibre channel SAN or other known network types as will be understood by those of ordinary skill in the art.

In one embodiment, for example, a congestion target setpoint may be set in the congestion control module 66 reflecting the desired congestion limit for controlling the deduplicated data processes. The congestion control module 66 may receive the congestion statistics 62 obtained from the sample of deduplicated data processes 64. Based on the sampled congestion statistics 62, the congestion control module may then calculate a single congestion metric. The congestion control module 66 may compare the difference between the congestion target setpoint and the current single congestion metric to form a congestion limit. The congestion control module 66 may adjust the congestion limit to equal the congestion target setpoint. The congestion limit may be returned to one or more deduplicated data processes 64 to control the deduplicated data processing.

In one of the illustrated embodiments, each deduplication data processing activity occurring in the deduplicated data processes 64 may be categorized into a number of deduplication data types. In one embodiment, each of the deduplicated data process types measures the average response time of each operation over a determined period of time. Each response time may be normalized and combined with times from other deduplicated data process types. Each of the deduplication data types may be measured and assigned a scalable congestion range from a low range of no congestion and a high range of heavy congestion all contained in the congestion statistics 62. Each of the deduplicated data processes 64 may collect congestion of the common normalized latencies such as common input/output functions, read commands to a deduplicated storage system, write commands to a deduplicated storage system, and the average queue size of each operation being a sample of the ratio of the total time spent compared to the time widow duration. Other measurements may be measured to involve a variety of subset resources. Each process type occurring in the deduplicated data processes 64 may provide such measures as the average response time of each operation over a window of time and may be normalized and combined with other timing measurements for a variety of timing combinations. These measurements may then be categorized and averaged for each of the deduplicated data process types.

Figure 3:
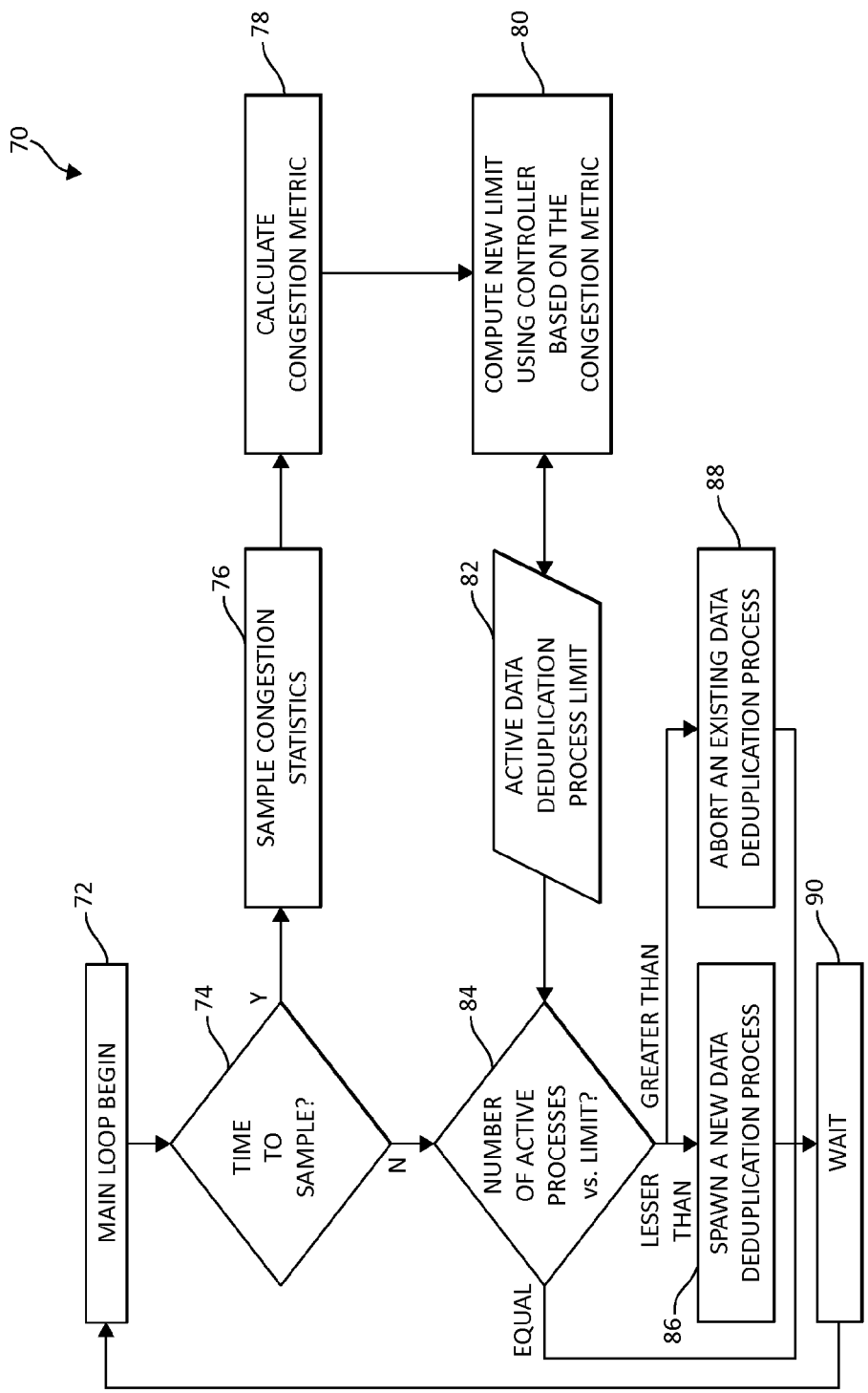
FIG. 3 illustrates an exemplary process for deduplicated data processing congestion control.

Turning now to FIG. 3, an exemplary process 70 for deduplicated data processing congestion control is illustrated. In one embodiment, method 70 may be implemented using deduplication system 30 (FIGS. 1 and 2) components, or various other processing, networking, and storage components in computing environments. As one of ordinary skill in the art will appreciate, various steps in the method 70 may be implemented in differing ways to suit a particular application. In addition, the described method may be implemented by various means, such as hardware, software, firmware, or a combination thereof operational on or otherwise associated with the computing environment. For example, the method 70 may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums as has been previously described.

Method 70 begins (step 72) with the completion of an initialization process (step 74) by determining whether a need exists for obtaining a sample of congestion measurements. In one embodiment, for example, several functions are initialized, any previously obtained congestion statistics are cleared, and a timeDeltaFromLastSample is obtained, defined as a time difference between the last previous call for collection of a sample pursuant to a function such as SampleCongestion( ).

As a following step to step 74, a sampling is obtained for a plurality of combined deduplicated data processing congestion statistics in a number of active deduplicated data processes (step 76). As previously indicated, in one embodiment, the function SampleCongestion( ) collects and combines the normalized latency of key sequences, obtaining each deduplicated data processes' congestion measurement.

As a following step, a single congestion metric is calculated from the sample of the combined deduplicated data processing congestion statistics in a number of active deduplicated data processes (step 78). The single congestion metric may be calculated from a variety of mechanisms, such as a control loop feedback mechanism. For example, as mentioned previously, the single congestion metric may, in one embodiment, be calculated with a congestion algorithm using one of at least three mathematically generated constants, $K_p$, $K_i$, $K_d$, the proportional constant, the integral constant, and the derivative constant in the congestion control module 66 (FIG. 2) pursuant to a PID (proportional-integral-derivative) controller mechanism. In this exemplary embodiment, each of the contributed congestion statistics of the deduplicated data processes is combined into the congestion algorithm including the proportional, integral, and the derivative constants. The constants $K_p$, $K_i$, $K_d$ are multiplied by the congestion error proportional, the congestion error integral, and congestion error derivative, to generate a proportional term, integral terms, and derivative terms. From the sum contribution of the proportional term's, the integral term's, and the derivative term's product, a single congestion metric may be calculated.

As stated previously, a variety of techniques may be implemented to formulate the single congestion metric. Some of these techniques, for example, generically implement a manipulated variable, a process variable, and error to generate the single congestion metric as one of ordinary skill in the art will appreciate.

Once the single congestion metric is calculated, a new congestion limit, based on the single congestion metric, is generated by comparing a congestion target setpoint to the single congestion metric (step 80). As discussed previously, comparing the congestion metric to the congestion target and continuously adjusting the congestion limit for the active duplication process limit at a particular time (step 82) permits continuous control of the congestion limit, preventing a failure or timeout.

As a following step, the congestion limit is compared to the number of active deduplicated data processes (step 84). If the number of active deduplicated data processes is less than the congestion limit, a new data deduplication process is spawned (step 86) and the method 70 moves to step 90 to wait for a predetermined time. If the number of active deduplicated data processes is greater than the congestion limit, an existing deduplication data process is aborted (step 88), and again, the method 70 moves to step 90 as previously indicated. Finally, if the number of active deduplicated data processes is equal to the congestion limit, the method 70 moves to step 90 and waits the predetermined time. Once the predetermined time has expired, the method 70 returns to step 72 as indicated.

Figure 4:
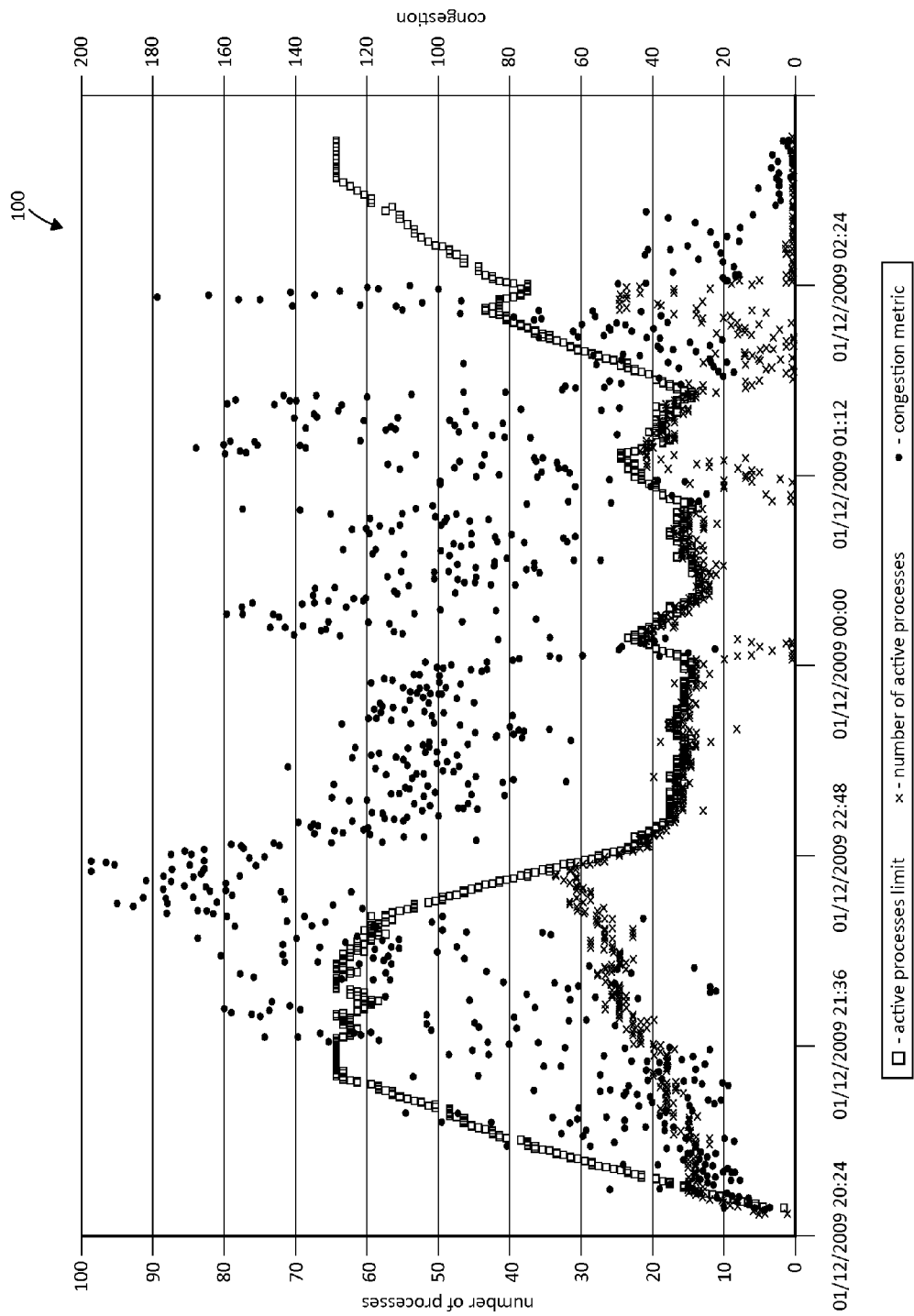
FIG. 4 illustrates an exemplary multidimensional deduplicated data processing congestion control.

Turning now to FIG. 4, following, a first exemplary graph 100 of deduplicated data processing congestion control is illustrated. Graph 100 depicts an exemplary implementation of method 70 (FIG. 3) with the congestion target setpoint of value of 100 running the number of deduplicated data processes of 64 over a three stage operation. In the illustrated example, the single congestion metrics (triangles) represent the average congestion experienced across all processes. The congestion limit, or number of active processes limit (squares) is set and controlled by the congestion control module. The total number of deduplicated data processes (diamonds) reflects the total number of deduplicated data processes occurring in the deduplicated data processes. As observed, the three stages of operation illustrated with each stage generating different amounts of congestion. In stage 1, around the time frame of 22:00, the congestion dynamics change and the congestion control module reacted to control and lower the number of active deduplicated data processes. In stage 2, marked just prior to 02:00, the deduplicated data process work neared completion with the congestion being lowered allowing for the congestion control module to release the restriction limits in stage 3, occurring after 02:00. As observed, the illustrated embodiments may respond to dynamic changes in congestion and maintain the congestion close to 100 set as congestion target setpoint. The response time may be improved by fine tuning the K constants.

Turning to FIG. 5, following, exemplary pseudo code of an exemplary implementation of deduplicated data processing congestion control module is shown. One of ordinary skill in the art will appreciate that various portions of the pseudo code follow the methodologies previously described in FIG. 3. For example, line 1 starts the main function, lines 2-13 relate to the loop being delayed within each iteration's end in line 12, line 4 collects and combines the latency measurement, lines 16-26 illustrate a simplified implementation of the K constants within the congestion control module with the K constants being predefined and tuned offline. The errorIntegral, which may be a term measuring the historical congestion metric errors, is initially set to zero, and the timeDeltaFromLastSample is the difference between calls for collecting and combining the normalized latency of key sequences, as previously discussed, measuring each deduplicated data processes to the next call for a congestion sample, SampleCongestion( ) in line 4. Here again, one of ordinary skill in the art will appreciate that the pseudo code in FIG. 5 may vary depending on a particular implementation.

As will be appreciated by one of ordinary skill in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wired, optical fiber cable, RF, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the above figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While one or more embodiments of the present invention have been illustrated in detail, the one of ordinary skill in the art will appreciate that modifications and adaptations to those embodiments may be made without departing from the scope of the present invention as set forth in the following claims.

What is claimed is:

1. A method for deduplicated data processing congestion control using at least one processor device in a computing environment, the method comprising:
   calculating a congestion target setpoint using one of a proportional constant, an integral constant, and a derivative constant, wherein the congestion target setpoint is a virtual dimension setpoint;
   determining a single congestion metric from a sampling of a plurality of combined deduplicated data processing congestion statistics in a number of active deduplicated data processes;

calculating a congestion limit from a comparison of the single congestion metric to the congestion target setpoint, the congestion limit being a manipulated variable; and comparing the congestion limit to the number of active deduplicated data processes, wherein if the number of active deduplicated data processes are less than the congestion limit, a new deduplicated data process of the number of active deduplicated data processes is spawned.

2. The method of claim 1, wherein the proportional constant represents a congestion error of a present deduplicated data processing activity, the integral constant indicates historical congestion errors of deduplicated data process activities, and the derivative constant forecasts a deduplicated data congestion error pattern trend.

3. The method of claim 1, further including, categorizing each of the number of active deduplicated data processes by a plurality of deduplicated data process types, and comparing the congestion limit to the number of active deduplicated data processes for each of the plurality of deduplicated data process types.

4. The method of claim 3, further including measuring the average response time of each of the number of active deduplicated data processes over a window of time, the window of time being a measurement of at least one of a normalized latency time period and a combination of a sum, an average, and a maximum time period.

5. The method of claim 4, further including normalizing each average response time and combining each average response time with times from other deduplicated data process types.

6. The method of claim 3, further comprising assigning a scalable congestion range to each of the deduplicated data process types from a low range of no congestion to a high range of heavy congestion.

7. A system for deduplicated data processing congestion control in a computing environment, comprising:
    at least one processor device operable in the computing environment, wherein the at least one processor device is adapted for:
    calculating a congestion target setpoint using one of a proportional constant, an integral constant, and a derivative constant, wherein the congestion target setpoint is a virtual dimension setpoint;
    determining a single congestion metric from a sampling of a plurality of combined deduplicated data processing congestion statistics in a number of active deduplicated data processes;
    calculating a congestion limit from a comparison of the single congestion metric to the congestion target setpoint, the congestion limit being a manipulated variable; and
    comparing the congestion limit to the number of active deduplicated data processes, wherein if the number of active deduplicated data processes are less than the congestion limit, a new deduplicated data process of the number of active deduplicated data processes is spawned.

8. The system of claim 7, wherein the proportional constant represents a congestion error of a present deduplicated data processing activity, the integral constant indicates historical congestion errors of deduplicated data process activities, and the derivative constant forecasts a deduplicated data congestion error pattern trend.

9. The system of claim 7, wherein the at least one processor device is adapted for categorizing each of the number of active deduplicated data processes by a plurality of deduplicated data process types, and comparing the congestion limit to the number of active deduplicated data processes for each of the plurality of deduplicated data process types.

10. The system of claim 9, wherein the at least one processor device is adapted for measuring the average response time of each of the number of active deduplicated data processes over a window of time, the window of time being a measurement of at least one of a normalized latency time period and a combination of a sum, an average, and a maximum time period.

11. The system of claim 10, wherein the at least one processor device is adapted for normalizing each average response time and combining each average response time with times from other deduplicated data process types.

12. The system of claim 9, wherein the at least one processor device is adapted for assigning a scalable congestion range to each of the deduplicated data process types from a low range of no congestion to a high range of heavy congestion.

13. A computer program product for deduplicated data processing congestion control using at least one processor device in a computing environment, the computer program product comprising a computer-readable storage medium having computer-readable program code portions stored therein, the computer-readable program code portions comprising:
    computer code for at least one processor device operable in the computing environment, wherein the at least one processor device is adapted for:
    computer code for calculating a congestion target setpoint using one of a proportional constant, an integral constant, and a derivative constant, wherein the congestion target setpoint is a virtual dimension setpoint;
    computer code for determining a single congestion metric from a sampling of a plurality of combined deduplicated data processing congestion statistics in a number of active deduplicated data processes;
    computer code for calculating a congestion limit from a comparison of the single congestion metric to the congestion target setpoint, the congestion limit being a manipulated variable; and
    computer code for comparing the congestion limit to the number of active deduplicated data processes, wherein if the number of active deduplicated data processes are less than the congestion limit, a new deduplicated data process of the number of active deduplicated data processes is spawned.

14. The program product of claim 13, wherein the proportional constant represents a congestion error of a present deduplicated data processing activity, the integral constant indicates historical congestion errors of deduplicated data process activities, and the derivative constant forecasts a deduplicated data congestion error pattern trend.

15. The program product of claim 13, further comprising computer code for categorizing each of the number of active deduplicated data processes by a plurality of deduplicated data process types, and comparing the congestion limit to the number of active deduplicated data processes for each of the plurality of deduplicated data process types.

16. The program product of claim 15, further comprising computer code for measuring the average response time of each of the number of active deduplicated data processes over a window of time, the window of time being a measurement of at least one of a normalized latency time period and a combination of a sum, an average, and a maximum time period.

17. The program product of claim 16, further comprising computer code for normalizing each average response time and combining each average response time with times from other deduplicated data process types.

18. The program product of claim 15, further comprising computer code for assigning a scalable congestion range to each of the deduplicated data process types from a low range of no congestion to a high range of heavy congestion.

* * * * *